United States Patent [19]

Mansolillo et al.

[11] 4,401,611
[45] Aug. 30, 1983

[54] EMBOSSING OF FOAMABLE PLASTISOLS ON DRY BLEND LAYERS

[75] Inventors: Robert D. Mansolillo, Bloomfield; Stanley J. Kaminski, Trenton, both of N.J.

[73] Assignee: Congoleum Corporation, Kearny, N.J.

[21] Appl. No.: 320,290

[22] Filed: Nov. 12, 1981

[51] Int. Cl.³ .................. B29C 23/00; B29H 7/20
[52] U.S. Cl. .................. 264/46.4; 264/52; 264/DIG. 82; 428/159
[58] Field of Search ............. 264/52, 46.4, DIG. 82; 428/159, 160, 158, 172, 203, 204, 318.6, 319.3, 428/319.7

[56] References Cited

U.S. PATENT DOCUMENTS

| | | | |
|---|---|---|---|
| 3,293,094 | 12/1966 | Nairn et al. | 428/158 |
| 3,905,849 | 9/1975 | Bomboire | 428/159 |
| 4,012,248 | 3/1977 | Rump et al. | 264/52 |
| 4,068,030 | 1/1978 | Witman | 428/159 |
| 4,198,456 | 4/1980 | Adams | 428/161 |
| 4,207,368 | 6/1980 | Schneider et al. | 428/204 |
| 4,234,641 | 11/1980 | Thompson et al. | 428/159 |
| 4,278,483 | 7/1981 | Mansolillo | 428/207 |

*Primary Examiner*—William J. Van Balen
*Attorney, Agent, or Firm*—Walter Katz

[57] ABSTRACT

Chemically embossed foamed plastic sheet, and method of producing it, which sheet is formed of a base layer of fused resin particles, such as PVC, randomly intermixed with particles of a foaming inhibitor, especially benzotriazole; and an upper layer of foamed plastic, such as PVC, having irregularly shaped, lump-like elevated areas interspersed with irregularly shaped, trough-like depressions. The depressions result from the inhibiting action of foaming inhibitor particles in the base layer upon the blowing agent used for expanding the foamed layer. In the Example, the foamed layer is pigmented PVC with a gloss surface, lying in rectangular patches upon the base layer; and the base layer is fused pigmented PVC intermixed with particles of benzotriazole giving it a grainy texture.

4 Claims, 2 Drawing Figures

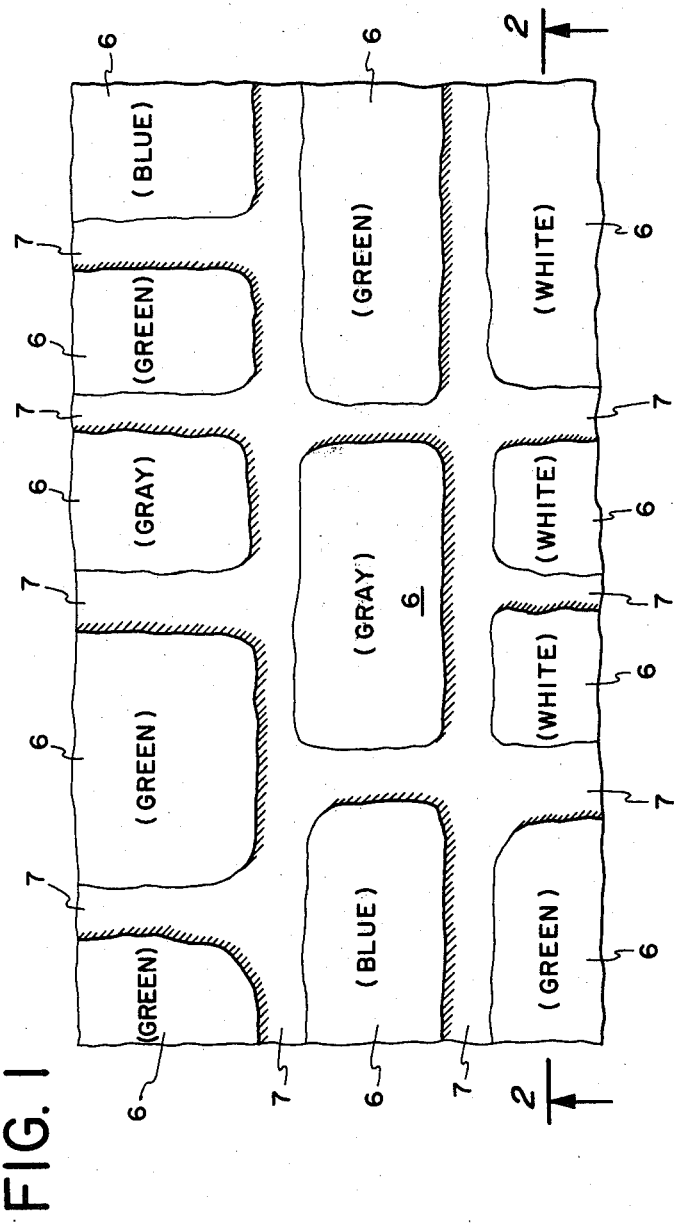
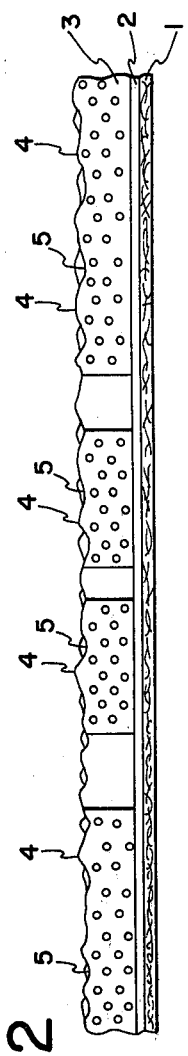
FIG. 1
FIG. 2

EMBOSSING OF FOAMABLE PLASTISOLS ON DRY BLEND LAYERS

BACKGROUND

This invention relates to improved resinous textured sheets of the general type of the known chemically embossed foamed thermoplastic resin sheets used in floor coverings, wall coverings, counter tops, upholstery, drapes and the like.

Chemically embossed thermoplastic resin sheets have been disclosed extensively in the prior art, for example in U.S. Pat. No. 3,293,094 of Dec. 20, 1966 to Nairn et al. for "Textured Foam Process". This patent discloses a number of variants of a process wherein a layer of foamable thermoplastic composition, comprising a chemical blowing agent and a plastisol, organosol, latex, or dry blend contacts over limited areas a foaming inhibitor, i.e., a chemical inhibitor or accelerator of decomposition of the blowing agent. The inhibitor prevents foaming of the foamable thermoplastic composition in the areas of the sheet where it is present, under conditions which allow foaming of the rest of the foamable composition; either by preventing decomposition of the blowing agent in contact therewith, or by accelerating such decomposition to the point that excessive pressure develops in the areas where foam is in contact with such decomposition accelerator and the foam consequently collapses in those areas. See Nairn et al. col. 13, line 59—col. 19, line 56.

Nairn et al. discloses that the foaming inhibitor can be in contact with the upper surface of the foamable layer containing blowing agent, or can contact the foamable layer from immediately below. See Nairn et al. at col. 4, lines 21-70. The pattern imposed by printing on the foamable layer with an inhibitor composition can be an exact reproducible design, or can be random. See Nairn et al. at col. 5, lines 29-31.

Nairn et al. sets forth numerous specific examples disclosing foamable plastisol compositions comprising thermoplastic resin, plasticizer, and blowing agent; and disclosing various chemical foaming inhibitors therefor. (Examples 1-81).

Also of possible pertinence is U.S. Pat. No. 4,278,483 of July 14, 1981 to R. D. Mansolillo for disclosure of dry blend granules deposited on a base sheet and sintered to form a porous mass; which dry blend is prepared from calender grade resin, especially PVC, and plasticizer and stabilizer. See col. 7, line 14—col. 8, line 33 and Example I. A mixture of dry blend and plasticizer is printed, e.g., using a silk screen, onto specific areas of the porous sintered layer in a design. An excess of the printing composition over that needed to fill the voids in the sintered layer below the printed areas is supplied; with the result that the printed areas are higher than the unprinted areas. The sheet is then consolidated by heat. See col. 2, lines 41-68; and col. 10, lines 39-51. A blowing agent can be included in the printing composition to enhance the textured appearance by forming a cellular composition when heated. See col. 10, line 52—col. 11, line 6.

SUMMARY AND ADVANTAGES OF THE INVENTION

In accordance with this invention, a novel composite organic resinous sheet is provided, comprised of at least one nonfoamed, organic resinous layer on a substrate and a foamed, textured organic resinous layer upon the nonfoamed layer, which texturing is in the form of randomly distributed, irregularly shaped lump-like elevated areas interspersed with irregularly shaped trough-like depressions.

In one preferred form, such nonfoamed layer is comprised of pigmented PVC particles and benzotriazole particles making a grainy texture; and such foamed layer is comprised of pigmented PVC with a glossy surface.

In a further aspect of this invention, such composite sheet is produced by a method consisting essentially of the steps:

(a) Laying down on a substrate, a dry blend composition consisting essentially of particles of thermoplastic organic resin randomly intermixed with particles of a chemical foaming inhibitor;

(b) Sintering said particles to form a stable layer comprised of adhering particles of resin and particles of said foaming inhibitor;

(c) Applying an organic foamable plastisol composition, containing thermoplastic resin and plasticizer therefor and a chemical blowing agent, upon said nonfoamed layer of thermoplastic resin and foaming inhibitor; which blowing agent is inhibited or accelerated in its decomposition by contact with said foaming inhibitor;

(d) Heating to a temperature level at which a portion of said blowing agent in the foamable plastisol composition decomposes, in response to the effect of time and temperature thereon as influenced by contact occurring between blowing agent and the foaming inhibitor in the nonfoamed layer; and moreover the resinous components are fused into a unitary, nonporous film or sheet, and the plastisol applied thereto is converted by solvation and ultimate fusion of the resinous component thereof, and by decomposition of the blowing agent into a foamable thermoplastic, foamed in randomly distributed, irregularly shaped lump-like elevated areas interspersed with irregularly shaped trough-like depressions.

Among the purposes, objectives and advantages of the invention are the provision of a textured foamed sheet having a textured appearance due to elevated areas interspersed with depressions in the foamed layer and susceptible of controlled variation of both texture and color; without mechanical embossing and without the need for a printing station to create such depressions.

DRAWINGS

In the drawings,

FIG. 1 is a diagrammatic plan view of a sheet in accordance with this invention, showing the random distribution of elevated and depressed areas.

FIG. 2 is a diagrammatic cross-sectional elevation, showing the elevated areas and depressions, through line 2—2 of FIG. 1.

DETAILS OF PREFERRED AND TYPICAL EMBODIMENTS

In preferred embodiments of this invention, advantage is taken of the possibilities for controlled variation of texture. When highly uniform texture throughout the sheet is desired, this can be obtained by using, in the nonfoamed layer of intermixed particles of thermoplastic organic resin and foaming inhibitor, foaming inhibitor particles of substantially uniform size as can be obtained by known methods such as controlled precipitation, screening and combinations thereof. On the other hand if variegated texturing effects are desired these can readily be obtained by varying the sizes of the foaming inhibitor particles and/or varying the ratio thereof to the thermoplastic particles over selected areas of the nonfoamed layer.

The Nonfoamed Layer

The nonfoamed layer (2 of the drawings) is laid down on a conventional substrate 1 appropriate for the intended use of the product.

Choices of thermoplastic resin and foaming inhibitor ingredients of the nonfoamed layer of this invention can be made generally among the various materials disclosed in the prior art for such purposes, observing the guidelines established in the prior art; but with the proviso that to obtain well defined texture by the method of this invention, the inhibitor must be used in the form of solid particles and not, as commonly in the prior art, in a liquid form.

A suitable and preferred thermoplastic resin generally used in this invention for the nonfoamed layer is low molecular weight calender grade PVC (polyvinyl chloride); but other resins such as acrylics and polymers of vinyl hydrocarbons can also be used, as known in the prior art for production of chemically embossed foamed thermoplastic resin sheets.

Typical prior art foaming inhibitors, useful in the nonfoamed layer in accordance with this invention, are benzotriazole, trimellitic anhydride, fumaric acid or thiourea; in the form of powder, grains, or granules. The particle sizes (i.e., maximum diameters) of these solid particles can be in a wide range, particularly in the range between about 20 and about 2000 microns; and can be highly uniform in a given sheet or area of a sheet, or widely varied.

The degree of texturing obtained ultimately in the foamed layer (3 of the drawings) will vary depending on the blowing conditions used; on the particular choice of foaming inhibitor in the nonfoamed layer; on the choice of thermoplastic, especially that in the foamed layer; and on the choice of blowing agent, all generally as in the prior art.

More especially the texture obtained will depend on the particle size of the inhibitor, as above indicated, and also on the weight ratio between inhibitor particles and thermoplastic particles in the nonfoamed layer. The most useful ratios between the particles are generally between about 10 and 30 parts by weight of the foaming inhibitor particles per 100 parts of said thermoplastic particles. Too small a particle size of the inhibitor and/or too small proportions of inhibitor produce too little texturing effect by allowing extensive overlapping of the elevated areas (reference numeral 4 of the drawings) ultimately formed, due to insufficient inhibition of the foaming action of the blowing agent; and conversely, too large particle sizes and/or too large proportions of inhibitor produce too large an occurrence of depressions (5) in the foamed layer.

The dry blend composition of mixed thermoplastic resin particles and particles of foaming inhibitor is laid down on the substrate in a layer of controlled thickness, such as a uniform thickness of about 50–500 microns. At least a portion of the thermoplastic resin will ordinarily be pigmented so as to conceal the underlying substrate. Pigmented resins of several colors can be used together in the same dry blend, to produce a mixed color effect.

The dry blend layer of thermoplastic resin particles and foaming inhibitor particles is now heated to sinter the particles into a stable layer comprising adhering particles of resin and particles of said foaming inhibitor. When the resin is PVC, above noted as preferred, the sintering operation will generally be carried out as known in the prior art, by heating for a few minutes at a temperature such as about 145°–190° C. (about 300°–375° F.).

The Foamed Layer

The foamed layer (3 of the drawings) is produced using a foamable composition comprised essentially of resin and plasticizer, preferably in the form of a plastisol, together with a blowing agent; all generally as in the prior art, and more particularly using a foamable plastisol such as described in Nairn et al., above cited, Example 3. As disclosed in the prior art, the choice of blowing agent must of course be interrelated with the choice of foaming inhibitor so that foaming will be inhibited where the blowing agent contacts inhibitor particles, under the conditions employed for the blowing step. A variety of blowing agents is disclosed, for example, in the above cited Nairn et al. patent at col. 11, line 42—col. 12, line 45; and choice of inhibitors effective therewith is discussed in Nairn et al. at col. 14, line 14—col. 19, line 56. A preferred foamable composition hereof comprises a plastisol from polyvinyl chloride, predominantly dispersion grade and plasticizer, predominantly phthalate ester, about 50–60 parts by weight per 100 parts of PVC, and about 2–4 parts of azodicarbonamide blowing agent per 100 parts of PVC. A desirable inhibitor for use in the nonfoamed layer of such a sheet is benzotriazole in the usual commercially available form of solid grains.

The foamable composition is applied upon the nonfoamed layer of sintered thermoplastic resin particles and foaming inhibitor particles; preferably by a printing operation, for example by screen printing. This printing can be in the form of a pattern such as a pattern of patches (6 of FIG. 1) separated by areas (7 of FIG. 1) where the nonfoamed layer is not printed upon. The foamable composition desirably will be pigmented to produce attractive color effects, which can vary from patch to patch as a result of using several printing stations each supplied with a differently pigmented foamable plastisol composition.

Since in the present method of producing chemically embossed foamable plastic sheets, no printing station is required to produce depressed areas or mortar lines, the present method has the advantage of allowing use of all printing stations of a given apparatus for producing variation of the printed pattern.

Other Features

As in the prior art, stabilizers for the thermoplastic resins will usually be included in the various compositions used herein.

Desirably, a wear layer is applied over the whole sheet after the foamable layer has been applied. To prepare the sheet for the wear layer, the foamable thermoplastic composition which has been applied thereto is gelled; then a nonpigmented plastisol or dry blend will be applied as a coating over the whole sheet to form the wear layer. See Nairn et al., above cited, at col. 19, lines 57–75.

Finally, the sheet is blown and at the same time the resin ingredients are fused into a unitary structure by heating, for example in an oven, generally as in the prior art. See Nairn et al. above cited at col. 20, lines 20–51.

Moreover as in the prior art, the substrate on which the nonfoamed layer is laid down can be a flexible sheet; such as felted cellulose fibers or mineral fibers impregnated with vinyl resin, acrylic or methacrylic resin, vinyl hydrocarbon polymer, rubber or rubber-like polymer, or thermosetting resin; and optionally sized with a barrier coat; all generally as disclosed in Nairn et al., above cited, at col. 7, line 33—col. 8, line 53; or such as a release sheet (Nairn et al., col. 8, lines 54–60).

EXAMPLE

The Example which follows illustrates the present invention and the best mode contemplated by the inventors of carrying out this invention, but it is not to be understood that the invention is limited to all details of this Example.

A chemically embossed foamed polyvinyl chloride resin sheet of this invention, of the type useful as floor covering was prepared as follows:

(1) A base sheet of asbestos felt was coated to a thickness of approximately 5 mils (about 13 microns) with a clear plastisol of low molecular weight polyvinyl chloride and was heated, to gel the plastisol, in an oven for 3 minutes at about 300° F. (about 150° C.).

(2) The flexible substrate produced in Step (1) was coated to a thickness of approximately 50 mils (about 130 microns) with a mixture of (a) a dry blend consisting essentially of particles of clear plus variously pigmented low molecular weight calender grade PVC resins (100 parts by weight) phthalate ester (30–35 parts) along with stabilizer additives in a formulation generally similar to the dry blends of Example I of U.S. Pat. No. 4,278,483 (above cited); mixed with (b) 20% by weight of benzotriazole particles as commercially obtained, having particle sizes about like those of ordinary table salt. This mixture of particles was laid down on the substrate by means of a fixed gap to form a layer of substantially uniform thickness.

"Low molecular weight" polyvinyl chloride resin in the present context means resin having specific viscosity (ASTM D1243-60) not above about 0.50 dl/gm—see Nairn et al., above cited, at col. 9, line 75—col. 10, line 12 and Examples 1-15. It will be appreciated by those skilled in the art that what is desired in the dry blend is the quality of free flow of the particles sufficient for mixing the particles together at normal temperatures, without loss of individual identity of the particles, coupled with mutual adherence thereof at sintering temperatures below the point of fusion and below the point of decomposition of the blowing agent; so that accordingly, the molecular weight of the PVC polymer or polymers used and the nature and proportions of the plasticizer will be adjusted as necessary.

Various specific plasticizers of the phthalate type are well known and can be used singly or in mixture to adjust as desired the characteristics of the dry blend; these are available under various trade names including "Flexols" and "Santicizers".

(3) The sheet obtained by Step (2) was sintered in a forced hot air oven for 3 minutes at 300° F. (about 150° C.), forming a stable layer comprised of adhering particles of resin and particles of the benzotriazole foaming inhibitor.

(4) The sheet was removed from the oven and cooled.

(5) The cooled sheet was screen printed with four differently pigmented foamable plastisol compositions, in rectangular patches as indicated in FIG. 1 hereof (reference numeral 6); leaving between the patches, areas (7) of the nonfoamed layer (2) which were not printed upon.

The foamable plastisol compositions were generally similar to the foamable plastisol of Nairn et al. (above cited) at Example 3, and consisted essentially of:

| | |
|---|---|
| PVC dispersion grade | 600 parts by weight |
| PVC suspension grade | 200 parts by weight |
| Mixed benzyl and alkyl phthalate esters | 325 parts by weight |
| Alkyd secondary plasticizer | 102 parts by weight |
| CaCO$_3$ limestone filler | 100 parts by weight |
| Stabilizer | 8 parts by weight |
| Blow mix: | 70 parts by weight |
| Blow mix composition, by weight: | |
| Azodicarbonamide | 1000 parts |
| TiO$_2$ | 650 parts |
| ZnO | 375 parts |
| Petroleum hydrocarbon | 831 parts |
| Wetting Agent | 30 parts |
| Pigment | As needed for desired shades. |

(6A) The resulting sheet can be coated with a clear PVC plastisol or clear dry blend to form a wear layer, as in the prior art, if desired. See Nairn et al., above cited, at col. 19, lines 57–72.

(6B) The sheet was heated in a forced hot air oven for 4 minutes at 395° F. (about 200° C.) so as to fuse the resinous components thereof into a unitary, nonporous sheet and to foam the foamable thermoplastic PVC layer, in areas thereof not in contact with benzotriazole particles in the nonfoamed layer.

The resulting sheet was a composite sheet comprised of a flexible substrate; a nonfoamed pigmented PVC/benzotriazole layer having a grainy texture; and a glossy pigmented PVC foamed layer lying in a pattern of rectangular patches upon the nonfoamed layer and having texturing in the form of randomly distributed, irregularly shaped lump-like elevated areas interspersed with irregularly shaped trough-like depressions.

Summarizing with reference to the herein drawing figures, the subject sheet has the following elements:

A substrate 1 serving as a base.

A layer 2 (nonfoamed) on the substrate, composed of particles of thermoplastic resin randomly mixed (and partially fused) with foaming inhibitor particles.

A foamed layer 3 of thermoplastic resin and plasticizer, formed into a foam by gas produced (when the composition is heated) by a decomposable blowing agent. The foam is high at irregularly shaped elevated areas 4 and is lower at irregularly shaped depressions 5 resulting from presence, below these depressions, of foaming inhibitor particles.

Rectangular pigmented patches 6 of the foamed composition, fused onto the nonfoamed layer 2 (of FIG. 2).

Areas 7 between the patches 6, where the nonfoamed layer 2 is exposed.

What is claimed is:

1. Method of producing a composite sheet, the steps consisting essentially of:

(a) Laying down on a substrate, a dry blend composition consisting essentially of particles of thermoplastic organic resin randomly intermixed with particles of a chemical foaming inhibitor;

(b) Sintering said particles to form a stable layer comprised of adhering particles of resin and particles of said foaming inhibitor;

(c) Applying an organic foamable plastisol composition, containing thermoplastic resin and plasticizer therefor and a chemical blowing agent, upon said nonfoamed layer of thermoplastic resin and foaming inhibitor; which blowing agent is inhibited or accelerated in its decomposition by contact with said foaming inhibitor;

(d) Heating to a temperature level at which a portion of said blowing agent in the foamable plastisol composition decomposes, in response to the effect of time and temperature thereon as influenced by contact occurring between blowing agent and the foaming inhibitor in the nonfoamed layer; and moreover the resinous components are fused into a unitary, nonporous film or sheet, and the plastisol applied thereto is converted —by solvation and ultimate fusion of the resinous component thereof, and by decomposition of the blowing agent—into a foamable thermoplastic, foamed in randomly distributed, irregularly shaped lump-like elevated areas interspersed with irregularly shaped trough-like depressions.

2. Method of claim 1 wherein said particles of foaming inhibitor have average diameter in the range between about 20 and about 2000 microns and are in proportions between about 10 and 30 parts by weight of inhibitor per 100 parts by weight of said thermoplastic ingredient of the nonfoamed layer; and said foamable plastisol composition is applied patchwise upon said nonfoamed layer.

3. Method of claim 2 wherein said foaming inhibitor is at least one member of the group consisting of benzotriazole, trimellitic anhydride, fumaric acid and thiourea.

4. Method of claim 3 wherein the foamable plastisol composition consists essentially of polyvinyl chloride resin predominately dispersion grade; about 50–60 parts by weight of plasticizer predominantly phthalate esters, per 100 parts of polyvinyl chloride, and about 2–4 parts of azodicarbonamide blowing agent per 100 parts of polyvinyl chloride.

* * * * *